United States Patent [19]
Müller et al.

[11] 3,713,470
[45] Jan. 30, 1973

[54] SLICING MACHINE WITH MATERIAL ADVANCING CLAMPING MEANS

[75] Inventors: Ernest Müller; Albrecht Maurer, both of Balingen, Germany

[73] Assignee: Bizerba-Werke Wilhelm Kraut KG, Balingen/Wurtt, Germany

[22] Filed: Dec. 17, 1970

[21] Appl. No.: 99,018

[30] Foreign Application Priority Data

Dec. 18, 1969 Germany............P 19 63 352.4

[52] U.S. Cl. .................................................83/718
[51] Int. Cl. ..............................................B26d 5/20
[58] Field of Search.....146/102 R, 102 H, 102 L, 102 M, 146/94 C

[56] References Cited

UNITED STATES PATENTS

| | | | |
|---|---|---|---|
| 1,746,242 | 2/1930 | Dawson | 146/102 L |
| 2,355,487 | 8/1944 | Van Berkel | 146/94 C |

*Primary Examiner*—Willie G. Abercrombie
*Attorney*—Spencer & Kaye

[57] ABSTRACT

A slicing machine which can produce slices of varying thicknesses has a rotating circular blade mounted on a machine housing. A carriage is mounted on the machine housing adjacent the blade for reciprocating movement between two end positions in a direction parallel to the plane of the blade. A clamping device is mounted on the carriage for holding a material to be sliced and for advancing the material in a direction transverse of the path of movement of the carriage and toward the plane of the blade a distance which is a function of a predetermined slice thickness. The clamping means is advanced by a device having a continuously variable abutment attached to the machine housing. A rack is mounted on the carriage means for relative movement with respect thereto and is arranged to contact the abutment and be restrained thereby from movement with the carriage as the carriage moves to one of its end positions. A pinion rotatably mounted in the housing engages the rack for rotation thereby as the carriage moves relative to the rack when the rack is restrained by the abutment an angular amount which depends on the position of the abutment. An overrunning clutch is connected to the pinion and a screw is connected to the clutch for rotation therewith. The screw is connected to the clamping device by a follower member which engages in the threads of the screw and advances the clamping device only when the screw rotates.

5 Claims, 8 Drawing Figures

Inventors.
Ernst Müller
Albrecht Maurer
BY Spencer & Kaye
ATTORNEYS.

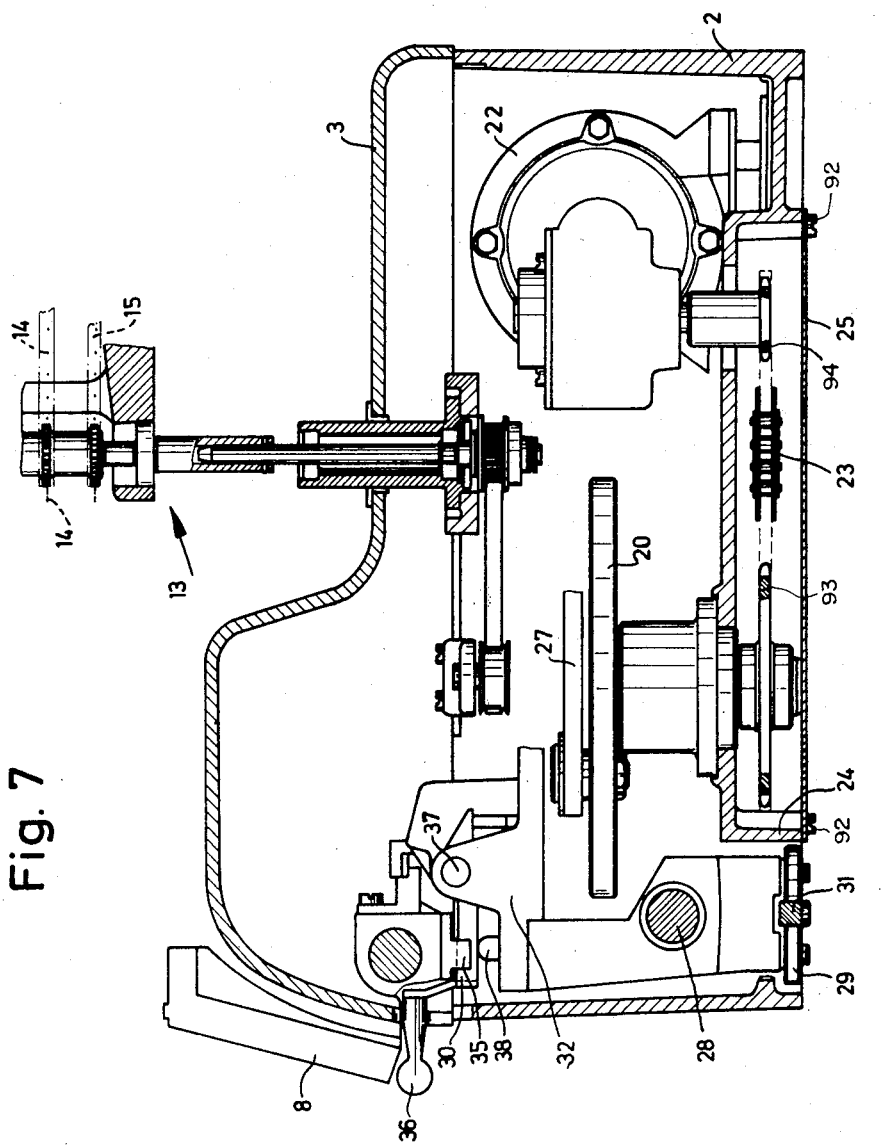

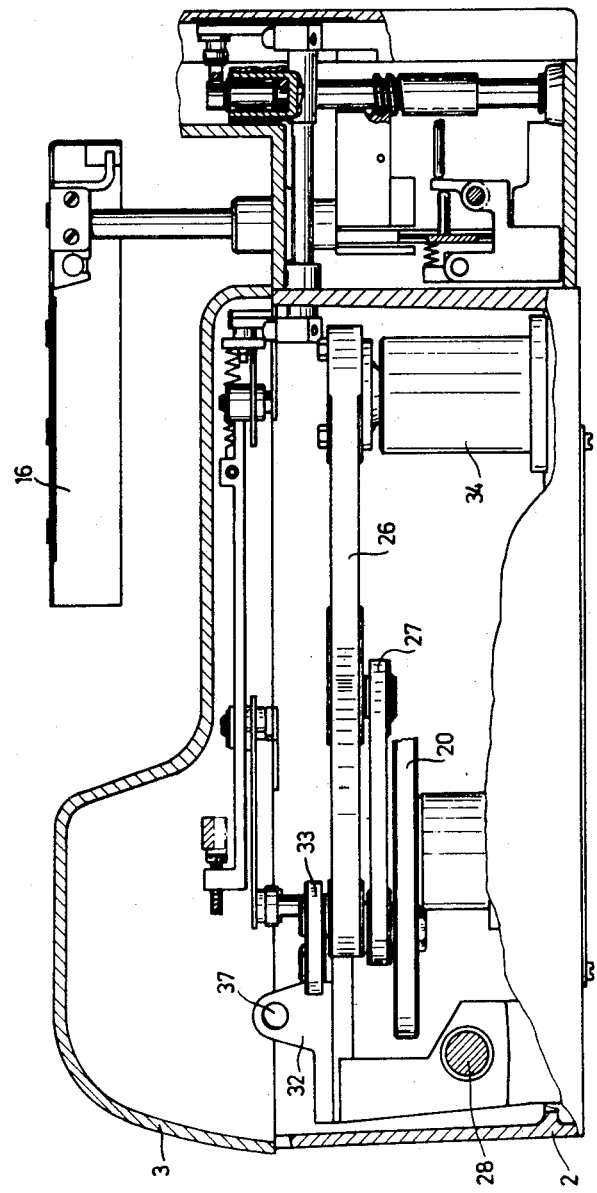

SLICING MACHINE WITH MATERIAL ADVANCING CLAMPING MEANS

BACKGROUND OF THE INVENTION

The present invention relates to a slicing machine which can produce slices of varying thicknesses and in which a driven carriage for holding the material to be sliced is movable back and forth on a machine housing relative to a rotating circular blade. The slicer also has a clamping device for the material to be sliced which is mounted on the carriage and advances the material to be sliced in dependence on the set slice thickness in a direction transverse to the direction of movement of the carriage.

The known slicing machines of this type primarily serve for slicing sausages, lunch meats, and the like. They have the disadvantage that the slice thickness — that is, the respective thickness of the cut slices — cannot be continuously varied and the drive for advancing the clamping devices requires a relatively large structural space.

SUMMARY OF THE INVENTION

It is an object of the present invention to provide a slicing machine having a simple drive for the advancing movement of the clamping device, and in which the slice thickness can be continuously varied.

This object is accomplished according to the present invention in that a screw is provided for driving the clamping device which can be rotated, with the intermediary of a pinion and a overrunning clutch, by means of a rack which is mounted on the carriage for movement therewith and is biased by a spring. The rack is stopped at the end of each carriage movement by an abutment firmly connected with the housing and continuously variable in its setting. The pinion is rotated in a stepwise manner with each movement by an angular value which depends on the position of the abutment.

In a preferred embodiment of the present invention, the clamping device is connected with the screw by means of a disengageable follower member, and one end of the screw is provided with a knob for finely adjusting the clamping device. It is favorable if the abutment is designed as an abutment lever whose position can be set via a screw nut drive.

It is of advantage if a protective bar is disposed in the vicinity of the circular blade, which bar is movable in a direction transverse to the blade surface and which shields the cutting area against undesired contact. The distance of the bar from the blade is adjustable in dependence on the slice thickness, and the setting of the protective bar and of the abutment lever preferably occur simultaneously and are continuously variable by means of the same screw and nut drive.

It is also favorable to have separate motors for driving the carriage for the material to be sliced and for driving the circular blade. Preferably, a crank drive moves the carriage back and forth and a transmission lever is connected with the crank drive. The distance of the carriage path can then be a multiple of the crank drive. Furthermore, a releasable clutch may be provided between the carriage and its drive.

BRIEF DESCRIPTION OF THE DRAWINGS

FIG. 7 is a side elevation, cross-sectional view of the carriage drive.

FIG. 8 is a partly cut away, partly cross-sectional, side elevation view of the carriage drive of FIGS. 6 and 7.

DESCRIPTION OF THE PREFERRED EMBODIMENTS

Figure 1:
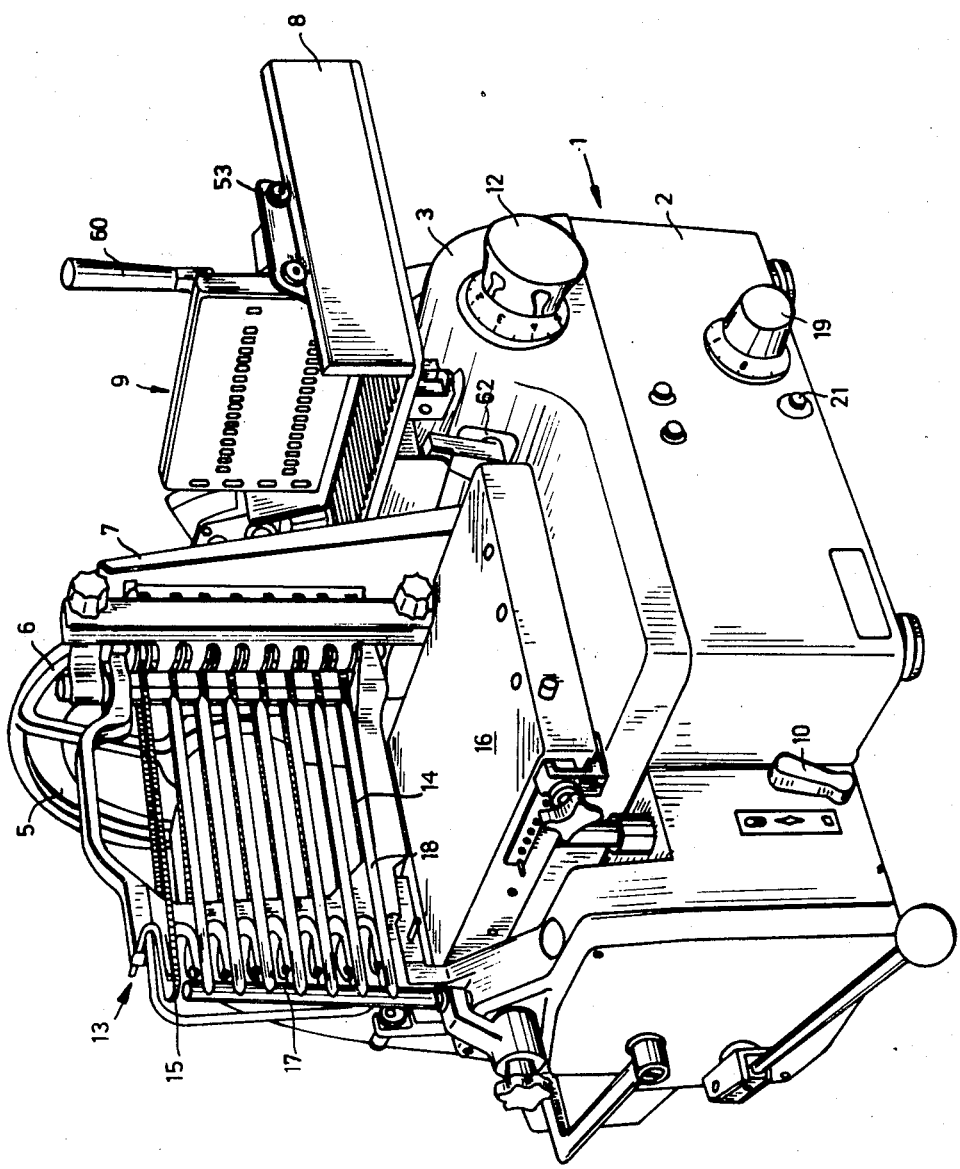
FIG. 1 is a front perspective view of a slicer according to the present invention.

The portions of the slicing machine shown in FIG. 1 that are not set out in detail herein are more fully disclosed in applicants' commonly owned copending application filed Dec. 7, 1970, Ser. No. 95,552 and entitled "Slicing Machine," and based on German application No. P 19 61 069.6 filed in Germany on Dec. 5, 1969.

Figure 2:
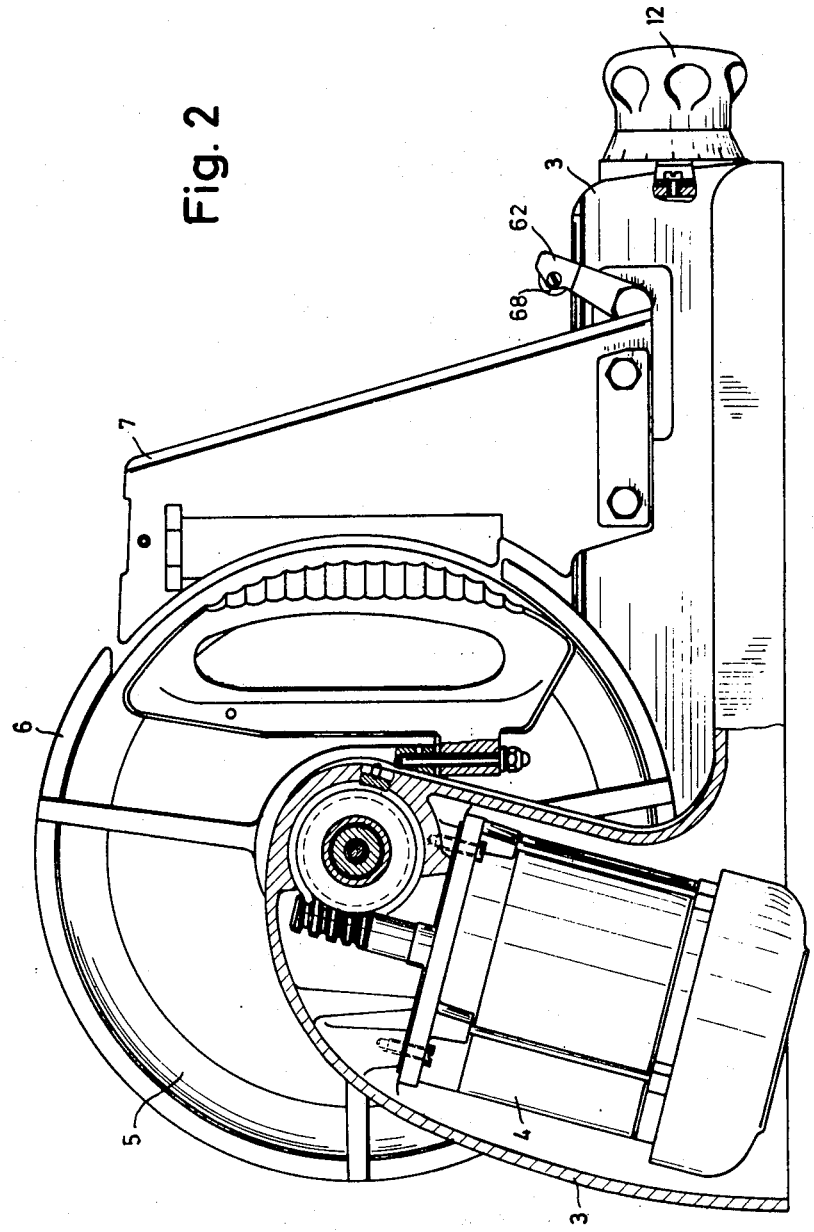
FIG. 2 is a cross-sectional view of a circular blade with a drive as seen in the direction from the left side of the machine of FIG. 1.
Figure 3:
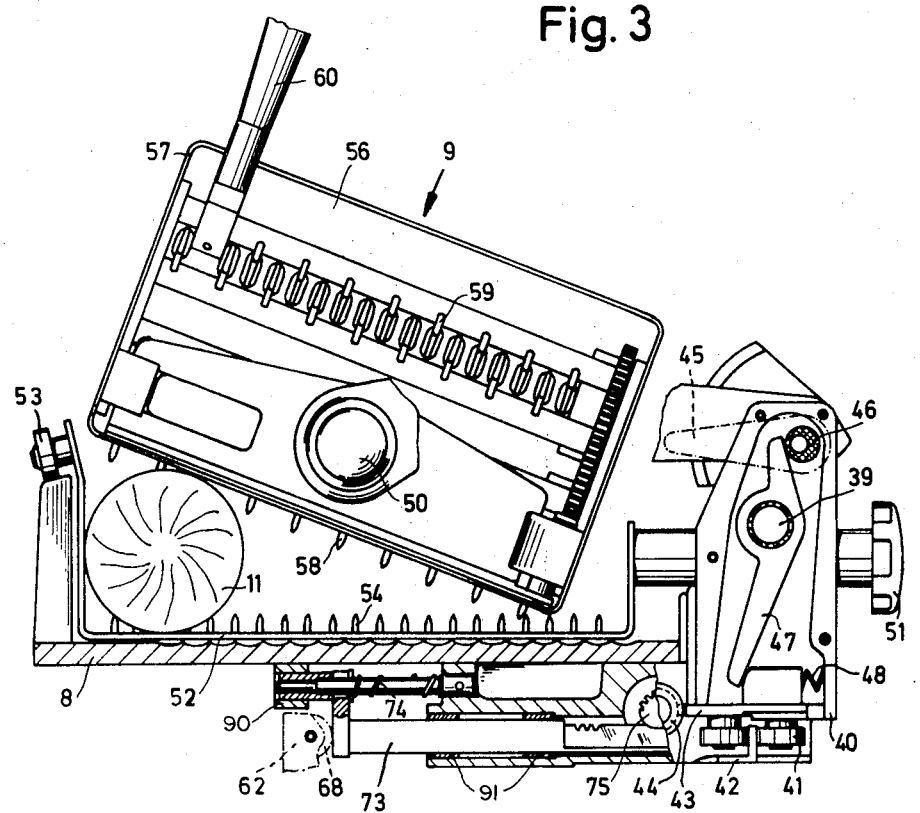
FIG. 3 is a partly cut away, cross-sectional view of a carriage for the material to be sliced as seen from the right side of the machine of FIG. 1.
Figure 4:
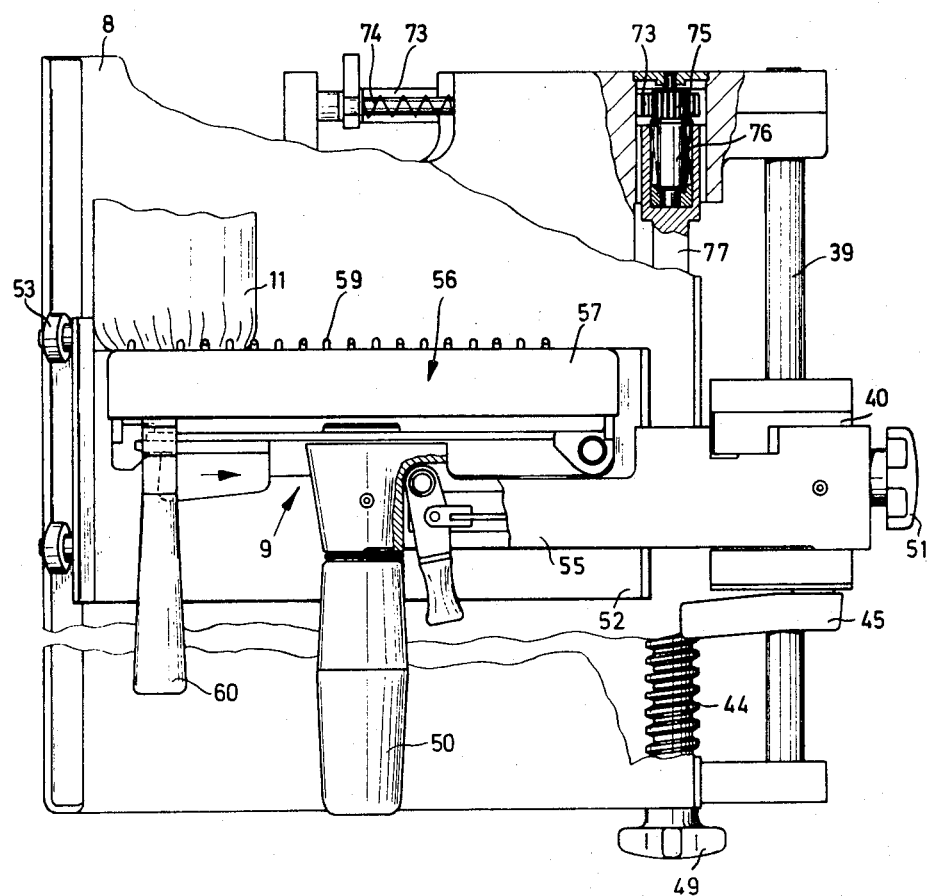
FIG. 4 is a partly cut away, top plan view of the carriage of FIG. 3 with its clamping device.

A circular blade 5 is mounted on a housing 1 (FIG. 1) consisting of two sections 2 and 3. Blade 5 is driven by a motor 4 (FIG. 2) and is arranged to rotate in a vertical plane. The cutting edge of the circular blade 5 is covered in the area not used for slicing by a stationary protective ring 6 which is mounted on housing section 3 in a known manner. The cutting area of blade 5 is shielded against unintentional contact by a protective plate 7 which is movable transverse to the plane of blade 5 in dependence on the desired slice thickness. A carriage 8 for holding the material to be sliced is disposed on housing section 3 so that it can be moved back and forth, or reciprocated, in direction parallel to the plane of the circular blade 5 — in FIG. 1 this is from the right front to the left rear. The drive for carriage 8 is disposed in housing section 2. A clamping device 9 for the material to be cut 11, such as a loaf of luncheon meat (FIGS. 3 and 4) is disposed on carriage 8 and is displaceable in a direction transverse to the direction of movement of carriage 8.

The clamping device 9 is driven in a manner to be described in detail below on carriage 8 in a direction perpendicular to the direction of movement of carriage 8, so that after a slice has been sliced the material to be cut 11 is advanced by the predetermined thickness of one slice. That is, it is advanced with each reciprocating movement of carriage 8 toward the left in FIG. 1. With the subsequent carriage movement, the next slice can be sliced at the same predetermined thickness as the previous slice. The thickness of the cut slices can be continuously set by a control member, such as a knob 12, in a manner which will also be described in detail below, over a range of, for example, about 0.1 to 10 mm. The preferred range is from about 0.5 to 8.5 mm.

A slice conveying device 13 is disposed on the side of the circular blade 5 which is opposite to the carriage 8. This device consists in a known manner of a plurality of superimposed endless chains 15 provided with horizontally, outwardly extending tips 14 (FIGS. 1 and 7). In front of and below the conveying device 13 a stacking table 16 is provided, which, depending on the setting of a selector lever 10, is lowered after each slicing movement by an amount equal to the set slice thickness or, alternatively, moves horizontally forward a predetermined distance. In the first case, a perpendicular stack of slices is produced in which the slices are stacked exactly one on top of the other, whereas in the second case, the slices are stacked on table 16 in a shingle-type arrangement in which they only partially overlap one another. The conveying device 13 has associated with it a known kicker 17. Cantilever mounted members 18, which in their rest position lie between chains 15, are attached to kicker 17 (FIG. 1).

The operation of the slicer which has been generally described above will now be described. The material 11 is arranged on the carriage 8 by means of the clamping device 9. After setting the desired slicing thickness at knob 12, a main switch (not shown) is actuated to cause the circular blade 5 to rotate. Now button switch 21 is pressed, so that carriage 8 commences its reciprocating movement. With each movement of carriage 8, a slice is sliced from the material 11 by the circular blade 5. After each cut, the clamping device 9 advances the material 11 in the direction toward the plane of the blade 5 by a distance corresponding to the thickness of one slice. The cut slices pass between blade 5 and protective plate 7 to be gripped by the tips 14 of chains 15 and then move in a perpendicularly suspended position to the members 18 of kicker 17. The slices are knocked from this position by the kicker 17, which at a suitable moment performs a sudden downward pivoting movement, and land on the stacking table 16 where they are stacked one after the other to form, depending on the position of selector lever 10, either a perpendicular or a flat, shingle-type stack.

Figure 6:
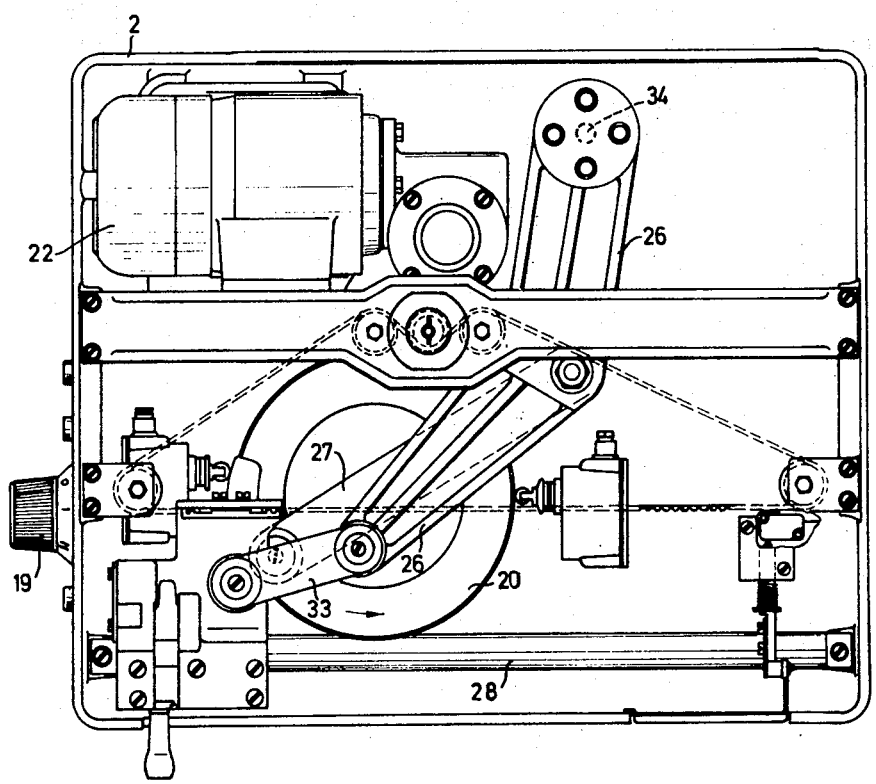
FIG. 6 is a top plan view of a carriage drive.

The reciprocating motion of carriage 8 is achieved by means of a crank drive disposed in housing section 2. A crank wheel 20 (FIGS. 6, 7 and 8) is driven by a conventional drive motor 22 via an endless power transmission chain 23. Chain 23 is arranged in a housing 24 and is accessible upon removal of a plate 25. Plate 25 is attached to housing 24 by suitable known means, such as screw fasteners 92. Chain 23 coacts with sprockets 93, 94 on the shaft of wheel 20 and motor 22, respectively. The diameter of the crank wheel 20 corresponds to a fractional ratio — for example, 1/2 — of the path traversed by the carriage 8 in just one direction. This diameter is translated to the full length of the carriage path by a lever 26 which is connected to the wheel 20 by means of a pivotally mounted connecting rod 27. Lever 26 is pivotally mounted in housing section 2 on a pedestal 34 (FIG. 8). A clutch support 32 is joined via a link 33 to the free end of lever 26, and slides on a shaft 28 while being guided on a rail 31 by means of two rollers 29. Carriage 8 is coupled with the clutch support 32 by a clutch lever 30 mounted on the clutch support 32, the clutch lever 30 engaging in a guide 35 defined in carriage 8 (FIG. 7). By depressing the clutch lever 30 which is mounted to be rotatable at 37 and which is held in engagement with guide 35 by means of a spring bolt 38, by gripping handle 36 and moving it downwardly, the carriage 8 can be decoupled from its drive.

The clamping device 9 (FIGS. 3 and 4) has a guide block 40 which is displaceably mounted on a rod 39 connected to carriage 8 and which is guided by two rollers 41 engaging a fixed angular, rail 42 which is fixedly mounted on carriage 8. A follower member 43 connected to guide block 40 displaceably and releasably engages into a screw 44 which is driven in steps with each movement of the carriage 8 in a manner to be described later, and advances the guide block 40 each time in the direction toward the plane of the circular blade 5 by an amount corresponding to the set slice thickness. The member 43 may be moved out of engagement with the screw 44 by pivoting a lever 45 approximately 180°, so that the clamping device 9 can be manually reciprocated with respect to the circular blade 5. A cam 46 (FIG. 3) is connected with lever 45 to turn therewith and adjust a lever 47 when lever 45 is pivoted. Lever 47 itself moves, by means of its lever arm opposite cam 46, the member 43 out of screw 44. Member 43 is biased into engagement with screw 44 by a suitable known spring 48. For manually finely adjusting the clamping device with respect to the circular blade 5, knob 49 (FIG. 4) is provided on screw 44 with which screw 44 can be manually turned, when for example, the material to be sliced is first clamped in.

A support member 52 is releasably attached to guide block 40 by means of a suitable, known clamping screw 51 and constitutes a part of the clamping device 9. This support 52 is displaceably guided along the edge of carriage 8 by means of two rollers 53. The support 52 is provided with two or more rows of mutually offset, upwardly extending gripper pins 54 which have pointed tips and which penetrate into the material 11 when it is placed on support 52.

The clamping device 9 further has a holder 56 having a housing 57 pivotally connected to guide block 40 and at whose underside is attached a series of downwardly directed, pointed gripper pins 58. These gripper pins 58 penetrate from the top into the material 11, which may be a piece of meat or the like, when material 11 is being clamped in, so that the meat or any other material to be sliced is held firmly between the gripper pins 54, 58 and under the weight of holder 56 and can be advanced on the carriage 8 in a direction toward the plane of the circular blade 5. The holder 56 can be continuously variably pivoted in a vertical plane by gripping a handle 50.

On the side surface of holder 56 facing the circular blade 5, a plurality of gripper hooks 59 are provided which may be pivoted out of and retracted back into the housing 57 by a handle 60 in a manner not shown. These gripper hooks 59 serve to clamp in short pieces of material 11 (FIG. 4) and are pressed into the rear of the material 11 on the side facing away from the plane of the circular blade 5 when handle 60 is actuated, so that holder 56 comes to rest substantially horizontally on, or flush with, holder 52.

An abutment lever 62 (FIGS. 1, 3 and 5) is pivotally mounted in housing section 3 and can be set by a screw and nut drive 63. This drive and its cooperation with the abutment lever 62 is shown in a partially schematic manner in FIG. 5. The knob 12 is rigidly connected with a screw 64 on which a nut 65 is arranged. The nut 65 is joined via a link 66 with the one arm of abutment lever 62 which is pivotally mounted at 67 to housing section 3. Turning screw 63 by knob 12 causes nut 65 to be displaced, so that the end position of abutment point 68 for lever 62 is changed.

A rack 73 (FIGS. 3 and 4) is displaceably mounted in slides 90,91 arranged below and attached to carriage 8. This rack 73 is pressed into its starting position — the position shown in FIGS. 3 and 4 — by a suitable, known helical spring 74. When carriage 8 is returned after cutting off a slice to its end position on the operator's side — to the left in FIGS. 3 and 4 — the rack 73 is displaced by a certain amount when it abuts on the abutment lever 62. The bias of spring 74 is overcome and spring 74 is deflected. The displacement of rack 73 is transmitted, via a pinion 75 which is rotatably mounted on carriage 8 to move therewith and mesh with the rack 73, a suitable, known overrunning clutch 76 which engages in this direction, and a shaft 77 to the screw 44 which, as already mentioned, serves to advance in steps the clamping device 9 via the follower member 43. When the carriage 8 is moved in the opposite direction — toward the right in FIGS. 3 and 4 — the rack 73 returns to its starting position under the bias of spring 74, the shaft 77 and the screw 44 remaining at rest because the overrunning clutch 76 does not engage in this direction to pass the rotation of pinion 75 to shaft 77.

Thus, the clamping device 9 is advanced a certain predetermined amount in the direction toward the plane of the circular blade 5 after each reciprocating movement of the carriage 8 with the aid of the rack 73 driving the screw 44 is steps. The length of this path, which determines the slice thickness — that is, the thickness of each sliced off piece — obviously depends on the position of abutment lever 62 set by knob 12. Depending on the position of lever 62, the rack 73 will arrive at abutment point 68 of lever 62 either earlier or later, so that the displacing movement of the rack 73 also starts either earlier or later and, thus, pinion 75 and therewith screw 44 are changed from their most recent position by a greater or lesser angular distance. This angular distance is translated via the member 43 into an advance movement of clamping device 9; this path and, thus, the slice thickness now also depend on the setting of lever 62. Since lever 62 is continuously variable via the screw and nut drive 63 (FIG. 5), the slice thickness can also be continuously varied in infinite increments.

Figure 5:
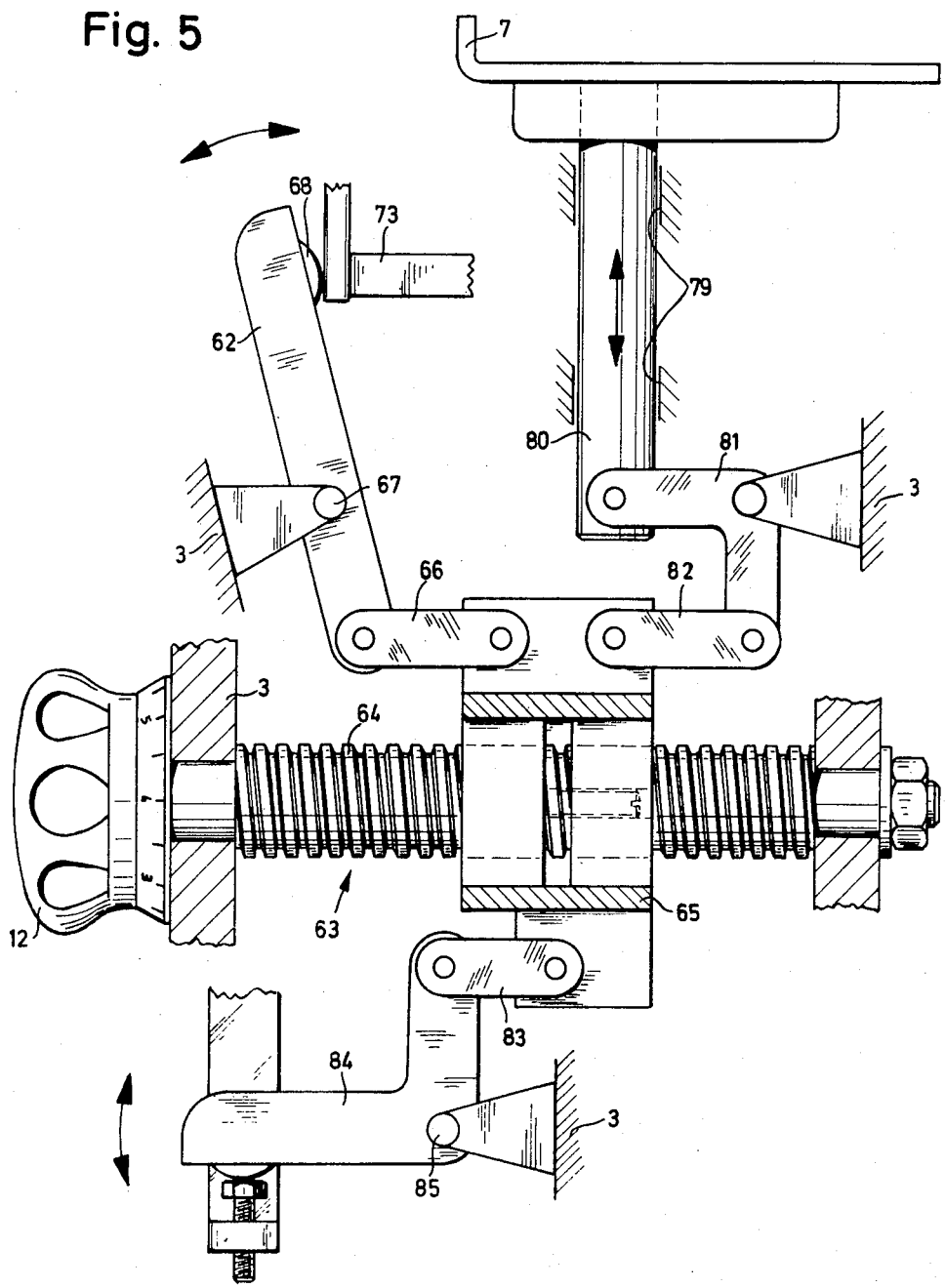
FIG. 5 is a partially schematic view, partly in cross section, of the device for continuously variably setting the slice thickness and the adjustment of a protective bar.

FIG. 5 also shows schematically how the position of the protective plate 7, which is connected with a shaft 80, is continuously varied with respect to blade 5 by means of a guide 79, a bell crank lever 81 pivotally mounted to housing section 3, and a link 82, when the screw 64 is turned. This variation occurs simultaneously with abutment lever 62 as a function of the set slice thickness. It should be understood that the protective plate 7, which shields the cutting area of circular blade 5 from undesired contact, can also be combined with other devices for setting the slice thickness than those described here and, thus, represents an independent structural element. The setting of the protective plate 7 may, in particular, occur in steps if the setting of the slice thickness is made in steps too.

As can also be seen in FIG. 5, a further abutment lever 84 is connected with nut 65 via a link 83 and is mounted to be pivoted at 85 to housing section 3. It can be adjusted together with the abutment lever 81 and protective bar 7 by turning screw 64 by knob 12. The respectively set end position of abutment lever 84 determines — in a manner not of interest here — the amount by which the stacking table 16 is lowered with each cutting movement, and which is equal to the slice thickness. Thus, the slicing machine according to the present invention permits the setting of the slice thickness as well as the lowering of table 16 and protective bar 7 with a single setting movement of knob 12.

It will be understood that the above description of the present invention is susceptible to various modifications, changes and adaptations, and the same are intended to be comprehended within the meaning and range of equivalents of the appended claims.

We claim:

1. A slicing machine which can produce slices of varying thicknesses, comprising, in combination:
   a. a rotating circular blade;
   b. a machine housing;
   c. carriage means mounted on said machine housing adjacent said blade for reciprocating movement between two end positions in a direction parallel to the plane of said blade;
   d. clamping means mounted on said carriage for holding a material to be sliced and for advancing the material to be sliced in a direction transverse of the path of movement of said carriage and toward the plane of said blade a distance which is a function of a predetermined slice thickness;
   e. means for advancing said clamping means and having a continuously variable abutment attached to said machine housing, a rack mounted on said carriage means for relative movement with respect thereto and arranged to contact said abutment and be restrained thereby from movement with said carriage means as said carriage means moves to one of its end positions, a pinion rotatably mounted in said housing and engaging said rack for rotation thereby as said carriage means moves relative to said rack when said rack is restrained by said abutment an angular amount which depends on the position of said abutment, an overrunning clutch connected to said pinion, and a screw connected to said clutch for rotation therewith and arranged to advance said clamping means, said advancing means having a follower means attached to said clamping means and engaging with said screw for moving said clamping means when said screw rotates, said screw having a pair of spaced ends and knob means attached to one of said ends for finely adjusting the position of said clamping means;
   f. a screw and nut drive means for varying the position of said abutment as a function of a predetermined slice thickness;
   g. a protective plate means arranged adjacent said blade for shielding said blade against unintentional contact; and
   h. means connected to said protective plate means for moving said protective plate means transverse to the plane of said blade and positioning said protective plate means relative to said blade as a function of a predetermined slice thickness, said screw and nut drive means simultaneously positioning said protective plate means and said abutment.

2. A slicing machine as defined in claim 1, wherein a drive motor means is arranged for driving said carriage, and a separate drive motor means is provided for driving said blade.

3. A slicing machine as defined in claim 2, further including crank drive means for reciprocating said carriage means between its two end positions.

4. A slicing machine as defined in claim 3, further including a lever connected to said crank drive means and said carriage means to transmit motion from said crank drive means to said carriage means, and wherein said crank drive means has a stroke and the distance between the two end positions of said carriage means is a multiple of the stroke of said crank means.

5. A slicing machine as defined in claim 4, further including clutch means arranged between said carriage means and said crank drive means for releasably connecting said carriage means to said crank drive means.

* * * * *

UNITED STATES PATENT OFFICE
CERTIFICATE OF CORRECTION

Patent No. 3,713,470     Dated January 30th, 1973

Inventor(s) Ernst Müller and Albrecht Maurer

It is certified that error appears in the above-identified patent and that said Letters Patent are hereby corrected as shown below:

In the heading of the patent, line 3, change "Ernest" to --Ernst--. Column 2, line 42, after "in" insert --a--. Column 5, line 31, after "44" change "is" to --in--.

Signed and sealed this 10th day of July 1973.

(SEAL)
Attest:

EDWARD M. FLETCHER, JR.  Rene Tegtmeyer
Attesting Officer        Acting Commissioner of Patents